US012641190B2

(12) United States Patent
Doty

(10) Patent No.: US 12,641,190 B2
(45) Date of Patent: *May 26, 2026

(54) REAL TIME VIDEO EDITING

(71) Applicant: Snap Inc., Santa Monica, CA (US)

(72) Inventor: Devin Doty, Brooklyn, NY (US)

(73) Assignee: Snap Inc., Santa Monica, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 18/426,777

(22) Filed: Jan. 30, 2024

(65) Prior Publication Data

US 2024/0244157 A1     Jul. 18, 2024

Related U.S. Application Data

(63) Continuation of application No. 18/147,087, filed on Dec. 28, 2022, now Pat. No. 11,943,562, which is a continuation of application No. 17/448,435, filed on Sep. 22, 2021, now Pat. No. 11,671,559.

(60) Provisional application No. 63/198,145, filed on Sep. 30, 2020.

(51) Int. Cl.
*H04N 5/91*          (2006.01)
*G06F 3/04883*       (2022.01)
*H04N 23/63*         (2023.01)
*G06F 3/04842*       (2022.01)

(52) U.S. Cl.
CPC .......... *H04N 5/91* (2013.01); *G06F 3/04883* (2013.01); *H04N 23/631* (2023.01); *G06F 3/04842* (2013.01)

(58) Field of Classification Search
CPC .... H04N 5/91; H04N 23/631; G06F 3/04883; G06F 3/04842
See application file for complete search history.

(56) References Cited

U.S. PATENT DOCUMENTS

| | | | |
|---|---|---|---|
| 7,971,156 B2 | 6/2011 | Albertson et al. | |
| 7,996,793 B2 | 8/2011 | Latta et al. | |
| 8,487,938 B2 | 7/2013 | Latta et al. | |
| 8,856,691 B2 | 10/2014 | Geisner et al. | |

(Continued)

FOREIGN PATENT DOCUMENTS

| | | |
|---|---|---|
| CN | 103049761 B | 8/2016 |
| CN | 107079201 A | 8/2017 |

(Continued)

OTHER PUBLICATIONS

"U.S. Appl. No. 17/448,435, 312 Amendment filed Jan. 9, 2023", 3 pgs.

(Continued)

*Primary Examiner* — Sunghyoun Park
(74) *Attorney, Agent, or Firm* — Schwegman Lundberg & Woessner, P.A.

(57)          ABSTRACT

A video recording process is commenced by a camera of a device. The video recording process produces a sequence of frames. While the video recording process is in progress, a gesture directed at the device is detected. A new first frame from the sequence of frames is displayed in a camera view user interface (UI) of the device, based on a characteristic of the gesture. A video file is generated using frames captured during the video recording process and the new first frame is set as a starting point of the video file.

20 Claims, 10 Drawing Sheets

(56) References Cited

U.S. PATENT DOCUMENTS

| | | | |
|---|---|---|---|
| 9,225,897 | B1 | 12/2015 | Sehn et al. |
| 9,230,160 | B1 | 1/2016 | Kanter |
| 9,276,886 | B1 | 3/2016 | Samaranayake |
| 9,705,831 | B2 | 7/2017 | Spiegel |
| 9,742,713 | B2 | 8/2017 | Spiegel et al. |
| 9,858,969 | B2 | 1/2018 | Khan |
| 9,860,451 | B2 | 1/2018 | Penha et al. |
| 9,948,861 | B2 | 4/2018 | Sahoo |
| 10,102,423 | B2 | 10/2018 | Shaburov et al. |
| 10,284,508 | B1 | 5/2019 | Allen et al. |
| 10,439,972 | B1 | 10/2019 | Spiegel et al. |
| 10,509,466 | B1 | 12/2019 | Miller et al. |
| 10,514,876 | B2 | 12/2019 | Sehn |
| 10,579,869 | B1 | 3/2020 | Xiong et al. |
| 10,614,855 | B2 | 4/2020 | Huang |
| 10,748,347 | B1 | 8/2020 | Li et al. |
| 10,750,115 | B1 | 8/2020 | Plom et al. |
| 10,958,608 | B1 | 3/2021 | Allen et al. |
| 10,962,809 | B1 | 3/2021 | Castañeda |
| 10,996,846 | B2 | 5/2021 | Robertson et al. |
| 10,997,787 | B2 | 5/2021 | Ge et al. |
| 11,012,390 | B1 | 5/2021 | Al Majid et al. |
| 11,030,454 | B1 | 6/2021 | Xiong et al. |
| 11,036,368 | B1 | 6/2021 | Al Majid et al. |
| 11,062,498 | B1 | 7/2021 | Voss et al. |
| 11,087,728 | B1 | 8/2021 | Canberk et al. |
| 11,092,998 | B1 | 8/2021 | Castañeda et al. |
| 11,106,342 | B1 | 8/2021 | Al Majid et al. |
| 11,126,206 | B2 | 9/2021 | Meisenholder et al. |
| 11,143,867 | B2 | 10/2021 | Rodriguez, II |
| 11,169,600 | B1 | 11/2021 | Canberk et al. |
| 11,227,626 | B1 | 1/2022 | Krishnan Gorumkonda et al. |
| 11,307,747 | B2 | 4/2022 | Dancie et al. |
| 11,531,402 | B1 | 12/2022 | Stolzenberg |
| 11,546,505 | B2 | 1/2023 | Canberk |
| 11,671,559 | B2 | 6/2023 | Doty |
| 11,943,562 | B2 | 3/2024 | Doty |
| 2009/0012788 | A1 | 1/2009 | Gilbert et al. |
| 2011/0267419 | A1 | 11/2011 | Quinn et al. |
| 2011/0301934 | A1 | 12/2011 | Tardif |
| 2014/0171036 | A1 | 6/2014 | Simmons |
| 2015/0120293 | A1 | 4/2015 | Wohlert et al. |
| 2015/0301708 | A1 | 10/2015 | Kostello et al. |
| 2015/0370320 | A1 | 12/2015 | Connor |
| 2016/0127638 | A1 | 5/2016 | Guo et al. |
| 2016/0217328 | A1 | 7/2016 | Yanai et al. |
| 2016/0225408 | A1 | 8/2016 | Khan |
| 2017/0123487 | A1 | 5/2017 | Hazra et al. |
| 2017/0277684 | A1 | 9/2017 | Dharmarajan Mary |
| 2017/0277685 | A1 | 9/2017 | Takumi |
| 2017/0282071 | A1* | 10/2017 | Kurabayashi ....... G06F 3/04847 |
| 2017/0351910 | A1 | 12/2017 | Elwazer et al. |
| 2018/0091728 | A1* | 3/2018 | Brown ................... H04N 23/62 |
| 2018/0158370 | A1 | 6/2018 | Pryor |
| 2018/0192116 | A1* | 7/2018 | Fortin ................... G06F 3/0631 |
| 2018/0225961 | A1* | 8/2018 | Okamura ................ B60R 11/04 |
| 2018/0348992 | A1 | 12/2018 | Ku et al. |
| 2019/0164298 | A1 | 5/2019 | Balish et al. |
| 2019/0364211 | A1 | 11/2019 | Chun |
| 2020/0110516 | A1 | 4/2020 | Ooba |
| 2020/0186728 | A1 | 6/2020 | Pena et al. |
| 2021/0011612 | A1 | 1/2021 | Dancie et al. |
| 2021/0074016 | A1 | 3/2021 | Li et al. |
| 2021/0103383 | A1 | 4/2021 | O'rourke et al. |
| 2021/0166732 | A1 | 6/2021 | Shaburova et al. |
| 2021/0174034 | A1 | 6/2021 | Retek et al. |
| 2021/0241529 | A1 | 8/2021 | Cowburn et al. |
| 2021/0258535 | A1 | 8/2021 | Wu et al. |
| 2021/0303075 | A1 | 9/2021 | Cowburn et al. |
| 2021/0303077 | A1 | 9/2021 | Anvaripour et al. |
| 2021/0303140 | A1 | 9/2021 | Mourkogiannis |
| 2021/0382564 | A1 | 12/2021 | Blachly et al. |
| 2021/0392405 | A1* | 12/2021 | Jomon ................... G06F 16/48 |
| 2021/0397000 | A1 | 12/2021 | Rodriguez, II |
| 2021/0405761 | A1 | 12/2021 | Canberk |

| | | | |
|---|---|---|---|
| 2022/0103780 | A1 | 3/2022 | Doty |
| 2022/0179665 | A1* | 6/2022 | Rathod .................. G06F 9/451 |
| 2022/0188539 | A1 | 6/2022 | Chan et al. |
| 2022/0206588 | A1 | 6/2022 | Canberk et al. |
| 2022/0300730 | A1 | 9/2022 | Eirinberg et al. |
| 2022/0300731 | A1 | 9/2022 | Eirinberg et al. |
| 2022/0326781 | A1 | 10/2022 | Hwang et al. |
| 2022/0334649 | A1 | 10/2022 | Hwang et al. |
| 2023/0135419 | A1 | 5/2023 | Doty |

FOREIGN PATENT DOCUMENTS

| | | | |
|---|---|---|---|
| CN | 116349220 | A | 6/2023 |
| EP | 3707693 | A1 | 9/2020 |
| JP | 2017200179 | A | 11/2017 |
| KR | 20190135794 | A | 12/2019 |
| KR | 20220158824 | A | 12/2022 |
| WO | WO-2016168591 | A1 | 10/2016 |
| WO | WO-2019094618 | A1 | 5/2019 |
| WO | WO-2022005687 | A1 | 1/2022 |
| WO | WO-2022005693 | A1 | 1/2022 |
| WO | WO-2022060549 | A2 | 3/2022 |
| WO | WO-2022066578 | A1 | 3/2022 |
| WO | WO-2022072240 | A1 | 4/2022 |
| WO | WO-2022132381 | A1 | 6/2022 |
| WO | WO-2022146678 | A1 | 7/2022 |
| WO | WO-2022198182 | A1 | 9/2022 |
| WO | WO-2022216784 | A1 | 10/2022 |
| WO | WO-2022225761 | A1 | 10/2022 |
| WO | WO-2022245765 | A1 | 11/2022 |

OTHER PUBLICATIONS

"U.S. Appl. No. 17/448,435, Notice of Allowance mailed Feb. 8, 2023", 7 pgs.

"U.S. Appl. No. 17/448,435, Notice of Allowance mailed Oct. 12, 2022", 8 pgs.

"U.S. Appl. No. 18/147,087, Corrected Notice of Allowability mailed Dec. 20, 2023", 2 pgs.

"U.S. Appl. No. 18/147,087, Non Final Office Action mailed Jun. 26, 2023", 13 pgs.

"U.S. Appl. No. 18/147,087, Notice of Allowance mailed Nov. 13, 2023", 8 pgs.

"U.S. Appl. No. 18/147,087, Response filed Jul. 28, 2023 to Non Final Office Action mailed Jun. 26, 2023", 7 pgs.

"European Application Serial No. 21876248.2, Response to Communication pursuant to Rules 161(1) and 162 EPC filed Nov. 1, 2023", 12 pgs.

"International Application Serial No. PCT/US2021/051980, International Preliminary Report on Patentability mailed Apr. 13, 2023", 5 pgs.

"International Application Serial No. PCT/US2021/051980, International Search Report mailed Jan. 5, 2022", 3 pgs.

"International Application Serial No. PCT/US2021/051980, Written Opinion mailed Jan. 5, 2022", 3 pgs.

"European Application Serial No. 21876248.2, Extended European Search Report mailed Oct. 14, 2024", 4 pgs.

"European Application Serial No. 25167860.3, Extended European Search Report mailed May 28, 2025", 7 pgs.

"Korean Application Serial No. 10-2023-7014742, Notice of Preliminary Rejection mailed May 14, 2025", w/ English Translation, 14 pgs.

"Chinese Application Serial No. 202180066541.2, Response to Examiner Telephone Interview filed Aug. 21, 2025", w/ English claims, 10 pgs.

"Korean Application Serial No. 10-2023-7014742, Response filed Jul. 14, 2025 to Notice of Preliminary Rejection mailed May 14, 2025", w/ English claims, 29 pgs.

U.S. Appl. No. 17/448,435 U.S. Pat. No. 11,671,559, filed Sep. 22, 2021, Real Time Video Editing.

U.S. Appl. No. 18/147,087, filed Dec. 28, 2022, Real Time Video Editing.

(56) References Cited

OTHER PUBLICATIONS

"European Application Serial No. 25167860.3, Communication Pursuant to Article 943 EPC mailed Mar. 25, 2026", 6 pgs.

* cited by examiner

REAL TIME VIDEO EDITING

CLAIM OF PRIORITY

This application is a continuation of U.S. patent application Ser. No. 18/147,087, filed Dec. 28, 2022, which is a continuation of U.S. patent application Ser. No. 17/448,435, filed Sep. 22, 2021, which claims the benefit of priority to U.S. Provisional Application Ser. No. 63/198,145, filed Sep. 30, 2020, which are incorporated herein by reference in its entireties.

BACKGROUND

The input/output I/O components of a client device often include one or more cameras (with still image/photograph and video capabilities). Camera applications provided with some mobile devices, such as smartphones, may include a feature that permits setting a timer with respect to a video recording session. For example, a user may set the timer to start the recording after 5 seconds, which would give them time to move away from the smartphone, to the area that is to be captured in a video. If such timer feature is not engaged, a user may simply press the record button and walk to the area that is being captured by the digital image sensor of the camera. The resulting recorded video may then include the first few seconds worth of frames where the user is not in the frames. In another example, where a user is recording a sports event, some exciting action may occur only some time after the recording has started. In both of these examples, the first part of the recording (where the user is not in the frames or when there is nothing exciting has yet happened in the sports event) may be of little or no interest to the user.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
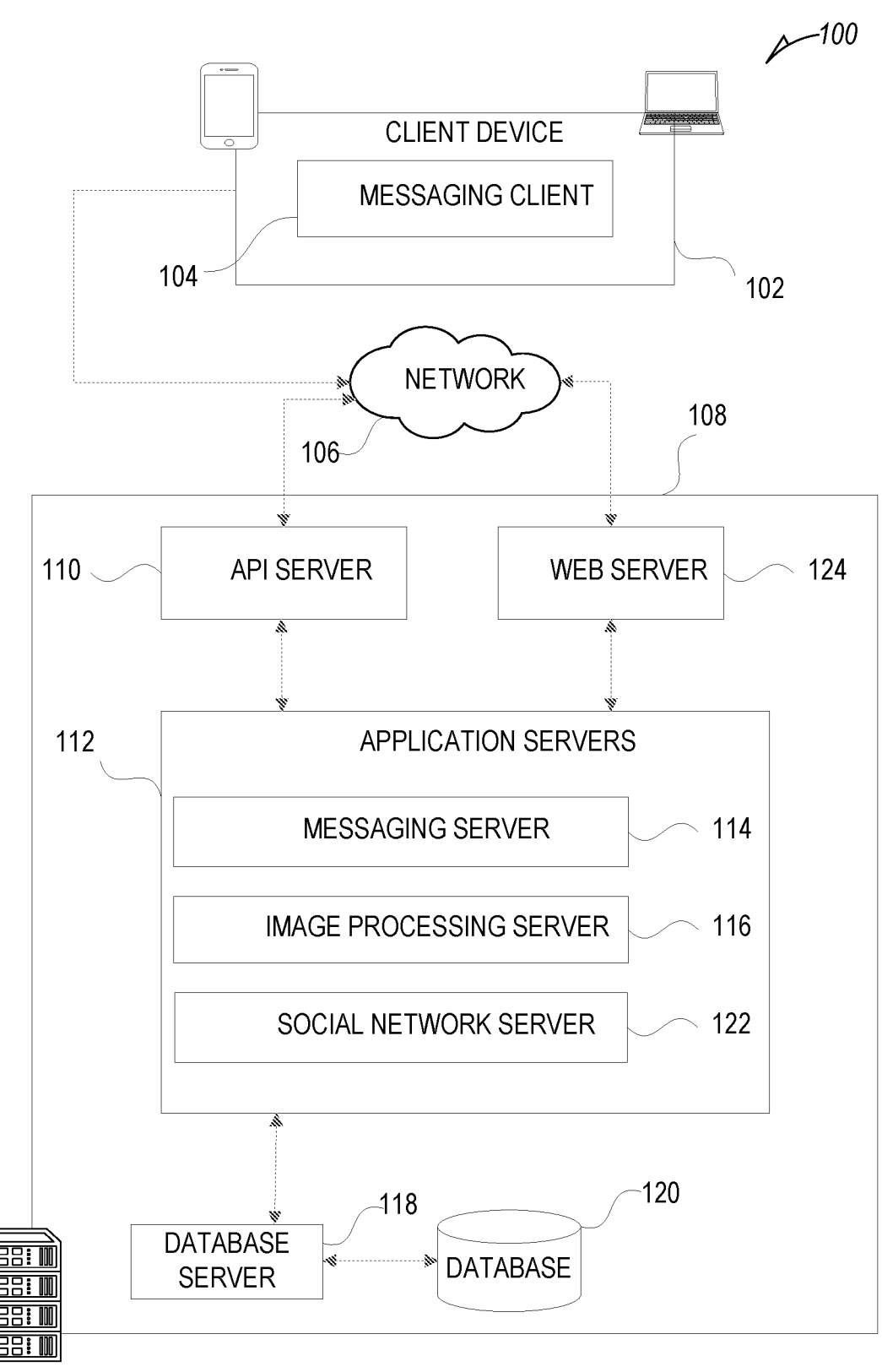
FIG. 1 is a diagrammatic representation of a networked environment in which the present disclosure may be deployed, in accordance with some examples.

Examples of the present disclosure improve the functionality of electronic software and systems by enhancing users' experience of utilizing a camera of a client device. Examples of the present disclosure further improve the functionality of electronic software and systems by reducing the amount of storage space and processing resources associated with generating a video file based on a sequence of frames captured in the process of video recording. In some examples, the reducing of the amount of storage space and processing resources required for creating a video file results from discarding some of the recorded video frames before creating and storing the video file.

In order to start and stop video recording, a user may activate the capture button provided in the user interface (UI) of the associated camera application. The camera of the client device, such as a smartphone, for example, captures the output of the digital image sensor of the camera, and, upon the ending of the recording session, the system generates a video file (also referred to as simply a video) using frames captured during the video recording process. The resulting video can be then saved and stored for future viewing. However, there are times when a user may wish to view the already-recorded frames, while the recording is still in progress. Furthermore, as mentioned above, depending on the circumstances surrounding a recording session, a recorded video may include a portion of frames at the beginning of the video that are of little or no value to the user.

The technical problem of generating a video that has the starting point later in time than the starting time of the associated recording session is addressed by providing a real time video editing functionality. In some examples, a real time video editing functionality is in the form of a real time video editor provided by a messaging system for exchanging data over a network, which is described further below, with reference to FIG. 1-5.

The use of a real time video editor can be described as follows. A user starts the video recording process by activating the capture button provided in the camera view user interface (UI) of the associated camera application and determines, at a later time, but while the video recording is still in progress, that the first portion of the video is not of interest to them. The user can then perform a predetermined gesture directed to the camera view UI, such as a left to right swiping gesture, which causes the camera view UI to display the captured frames to be displayed in reverse order, thus imitating or visualizing a process of rewinding the video. As the gesture stops, so stops the visualizing of the rewinding process and the user is presented with one or more frames corresponding to the place in the sequence of frames, up to which the video was rewound. The user may then be presented with a pop-up message requesting to either cancel or to confirm that the video file that would be created, once the video recording process is stopped, should start not with the first frame in the original sequence of frames (the first frame recorded at the time the recording process was commenced), but with the one or more frames currently displayed in the camera view UI, up to which the video was rewound. An example of operation of a real time video editor is described further below, with reference to FIG. 6. As mentioned above, in some examples a real time video editor is provided by a messaging system for exchanging data over a network, which is described below.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include, as examples, message content, client device information, geolocation information, media augmentation and overlays, message content persistence conditions, social network information, live event information, as well as images and video captured with a front facing camera of an associated client device using a viewfinder ring flash. Data exchanges within the messaging system 100 are invoked and controlled through functions available via user interfaces (UIs) of the messaging client 104. For example, the messaging client 104 can present a camera view UI that displays the output of a digital image sensor of a camera provided with the client device 102, a camera view UI that displays output of a digital sensor of the camera and a shutter user selectable element activatable to start a video recording process. Some examples of a camera view UI are described further below, with reference to FIG. 7-9.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112, and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. In some examples, a collection may include an a video generated using the real time video editor. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114. Some of the various image processing operations may be performed by various AR components, which can be hosted or supported by the image processing server 116. In some examples, an image processing server 116 is configured to provide the functionality of the real time video editor described herein.

Figure 3:
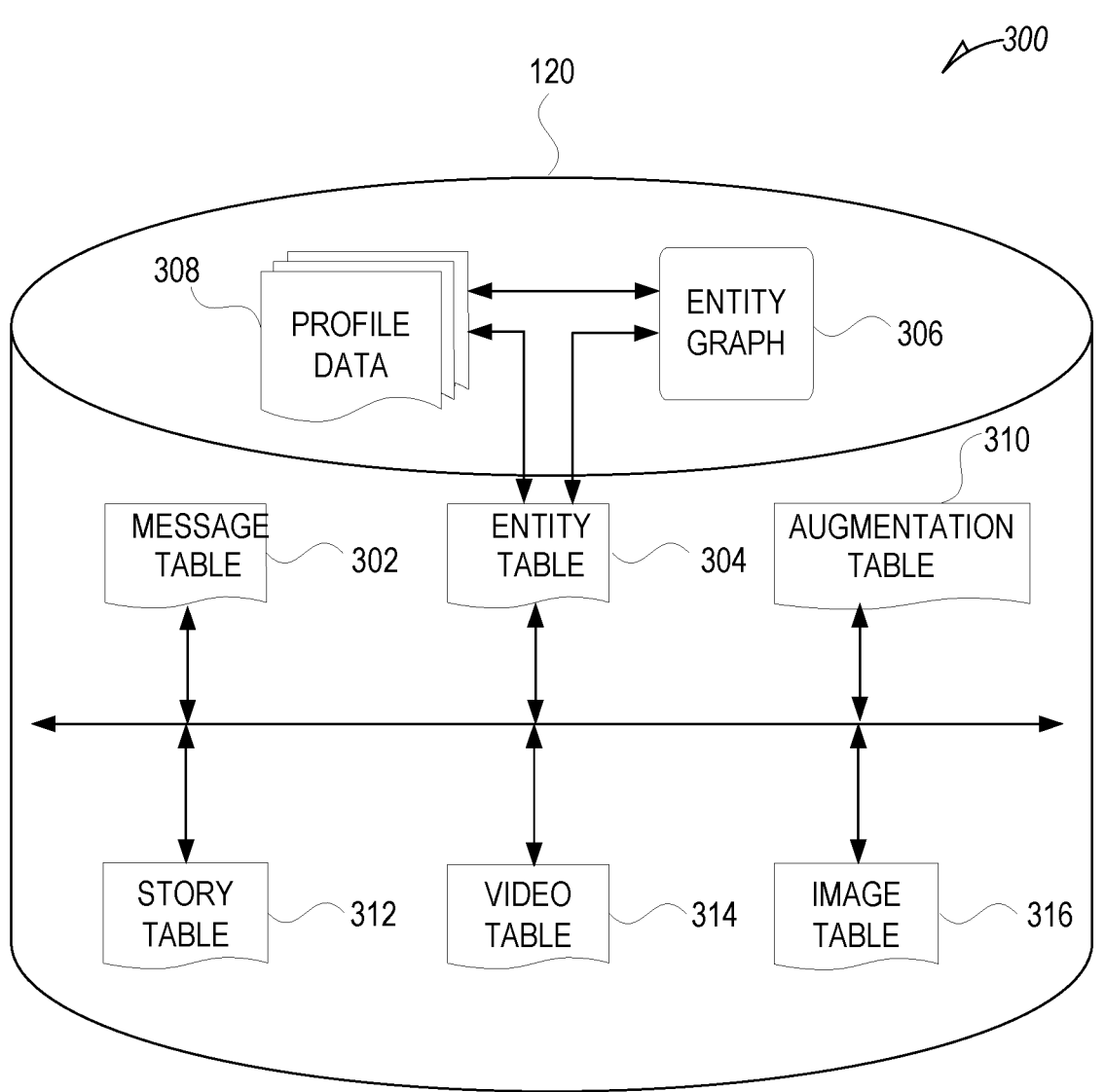
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has a "friend" relationship or is "following," and also the identification of other entities and interests of a particular user.

System Architecture

Figure 2:
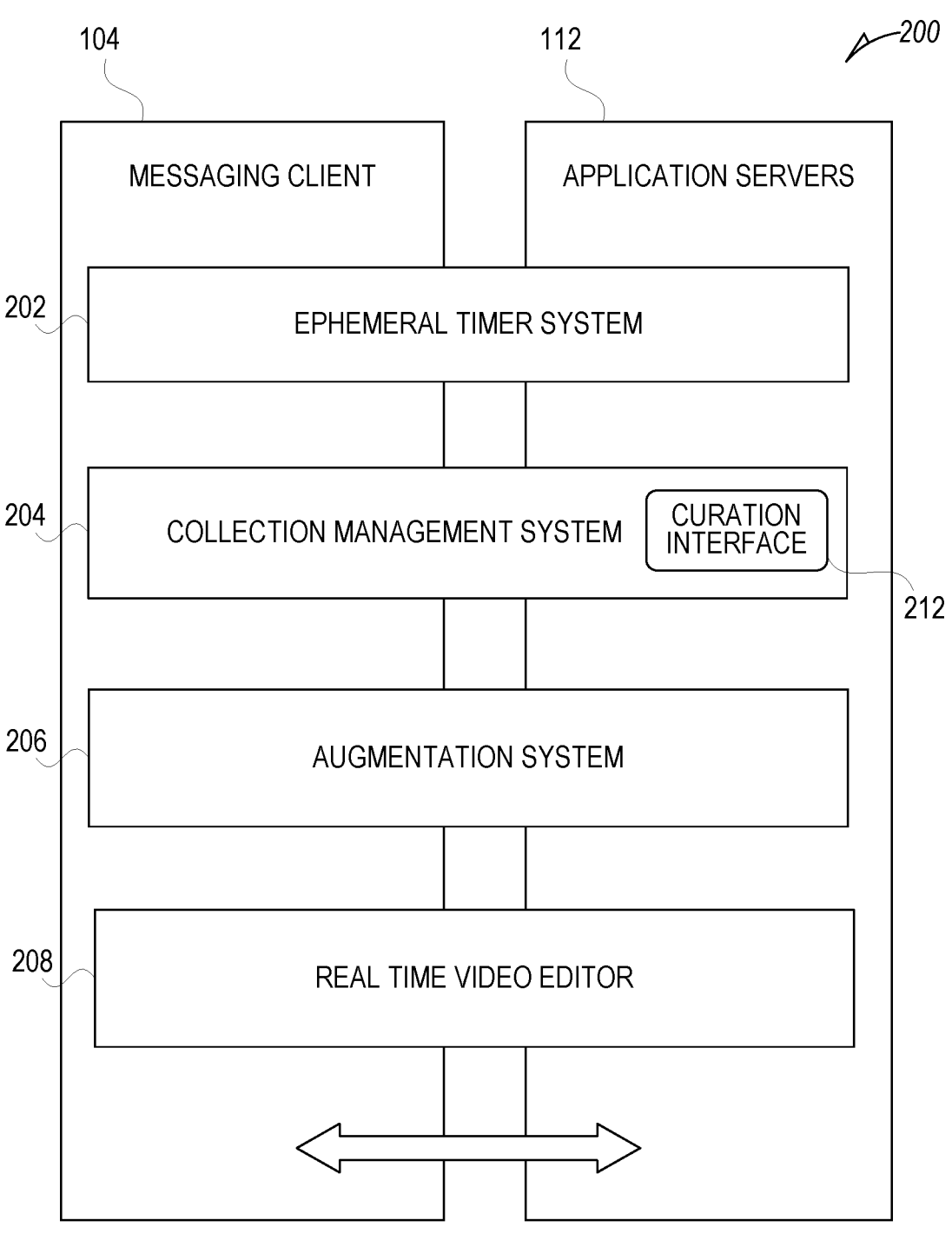
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104, and on the sever-side by the application servers 112. These subsystems include, for example, an ephemeral timer system 202, a collection management system 204, an augmentation system 206, and a real time video editor 208.

The real time video editor 208 is configured to facilitate changing the starting point of a video recording while the recording process is in progress, as described in further detail below, with reference to FIG. 6-9.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image, video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. In a further example, a collection may include content, which was generated using one or more AR components. In some examples, a media content item in a collection is generated using the real time video editor. The collection management system 204 may also be responsible for publishing an icon that provides notification of the existence of a particular collection to the user interface of the messaging client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content, which may be associated with a message. For example, the augmentation system 206 provides functions related to the generation and publishing of media overlays for messages processed by the messaging system 100. The media overlays may be stored in the database 120 and accessed through the database server 118. The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying.

The audio and visual content or the visual effects can be applied to a media content item (e.g., a photo) at the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 120.

In some examples, the augmentation system 206 is configured to provide access to AR components that can be implemented using a programming language suitable for app development, such as, e.g., JavaScript or Java and that are identified in the messaging server system by respective AR component identifiers. An AR component may include or reference various image processing operations corresponding to an image modification, filter, media overlay, transformation, and the like. These image processing operations can provide an interactive experience of a real-world environment, where objects, surfaces, backgrounds, lighting etc., captured by a digital image sensor or a camera, are enhanced by computer-generated perceptual information. In this context an AR component comprises the collection of data, parameters, and other assets needed to apply a selected augmented reality experience to an image or a video feed.

In some embodiments, an AR component includes modules configured to modify or transform image data presented within a graphical user interface (GUI) of a client device in some way. For example, complex additions or transformations to the content images may be performed using AR component data, such as adding rabbit ears to the head of a person in a video clip, adding floating hearts with background coloring to a video clip, altering the proportions of a person's features within a video clip, or many numerous other such transformations. This includes both real-time modifications that modify an image as it is captured using a camera associated with a client device and then displayed on a screen of the client device with the AR component modifications, as well as modifications to stored content, such as video clips in a gallery that may be modified using AR components.

Various augmented reality functionality that may be provided by an AR component include detection of objects (e.g. faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a 3D mesh model of the object or objects, and using transformations and animated textures of the model within the video to achieve the transformation. In other embodiments, tracking of points on an object may be used to place an image or texture, which may be two dimensional or three dimensional, at the tracked position. In still further embodiments, neural network analysis of video frames may be used to place images, models, or textures in content (e.g. images or frames of video). AR component data thus refers to both to the images, models, and textures used to create transformations in content, as well as to additional modeling and analysis information needed to achieve such transformations with object detection, tracking, and placement.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. The payload of a message may include content generated using a viewfinder ring flash. Further details regarding information that may be included in a message, and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example. With reference to the functionality provided by the AR component, the entity graph 306 stores information that can be used, in cases where the AR component is configured to permit using a portrait image of a user other than that of the user controlling the associated client device for modifying the target media content object, to determine a further profile that is connected to the profile representing the user controlling the associated client device. As mentioned above, the portrait image of a user may be stored in a user profile representing the user in the messaging system.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

The database 120 also stores augmentation data in an augmentation table 310. The augmentation data is associated with and applied to videos (for which data is stored in a video table 314) and images (for which data is stored in an image table 316). In some examples, the augmentation data is used by various AR components, including the AR component. An example of augmentation data is augmented reality (AR) tools that can be used in AR components to effectuate image transformations. Image transformations include real-time modifications, which modify an image (e.g., a video frame) as it is captured using a digital image sensor of a client device 102. The modified image is displayed on a screen of the client device 102 with the modifications.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story. In some examples, the story table 312 stores one or more images or videos that were created using a viewfinder ring flash.

As mentioned above, the video table 314 stores video data that, in one example, is associated with messages for which records are maintained within the message table 302. In some examples, the video table 314 stores one or more videos created using a real time video editor. Similarly, the image table 316 stores image data, which may be associated with messages for which message data is stored in the entity table 304. The entity table 304 may associate various augmentations from the augmentation table 310 with various images and videos stored in the image table 316 and the video table 314.

Data Communications Architecture

Figure 4:
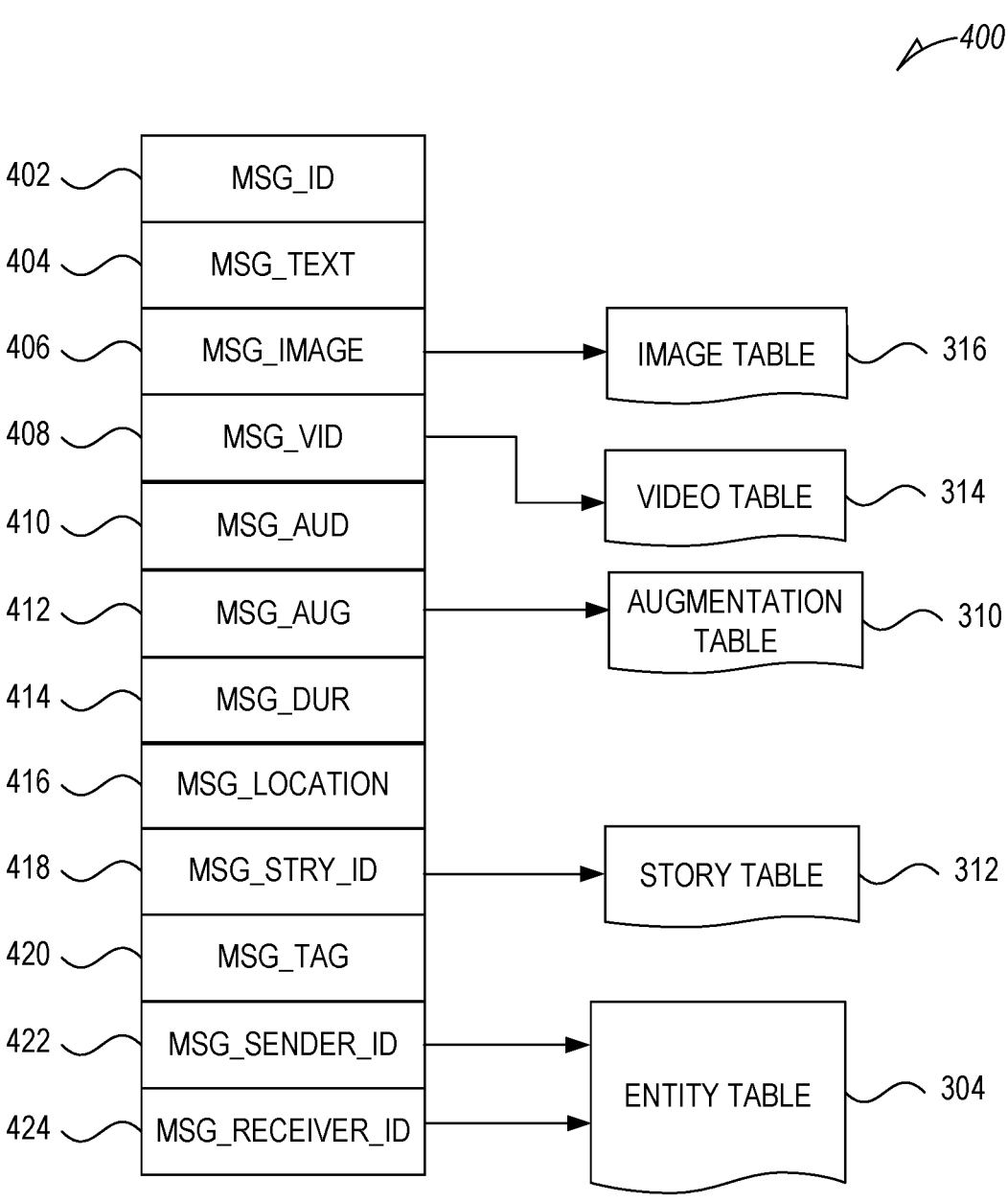
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. The content of a message 400, in some examples, includes an image or a video that was created using the AR component. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 316.

message video payload 408: video data, captured by a camera component or retrieved from a memory component of the client device 102, and that is included in the message 400. Video data for a sent or received message 400 may be stored in the video table 314. The video data may include content generated using a real time video editor.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Time-based Access Limitation Architecture

Figure 5:
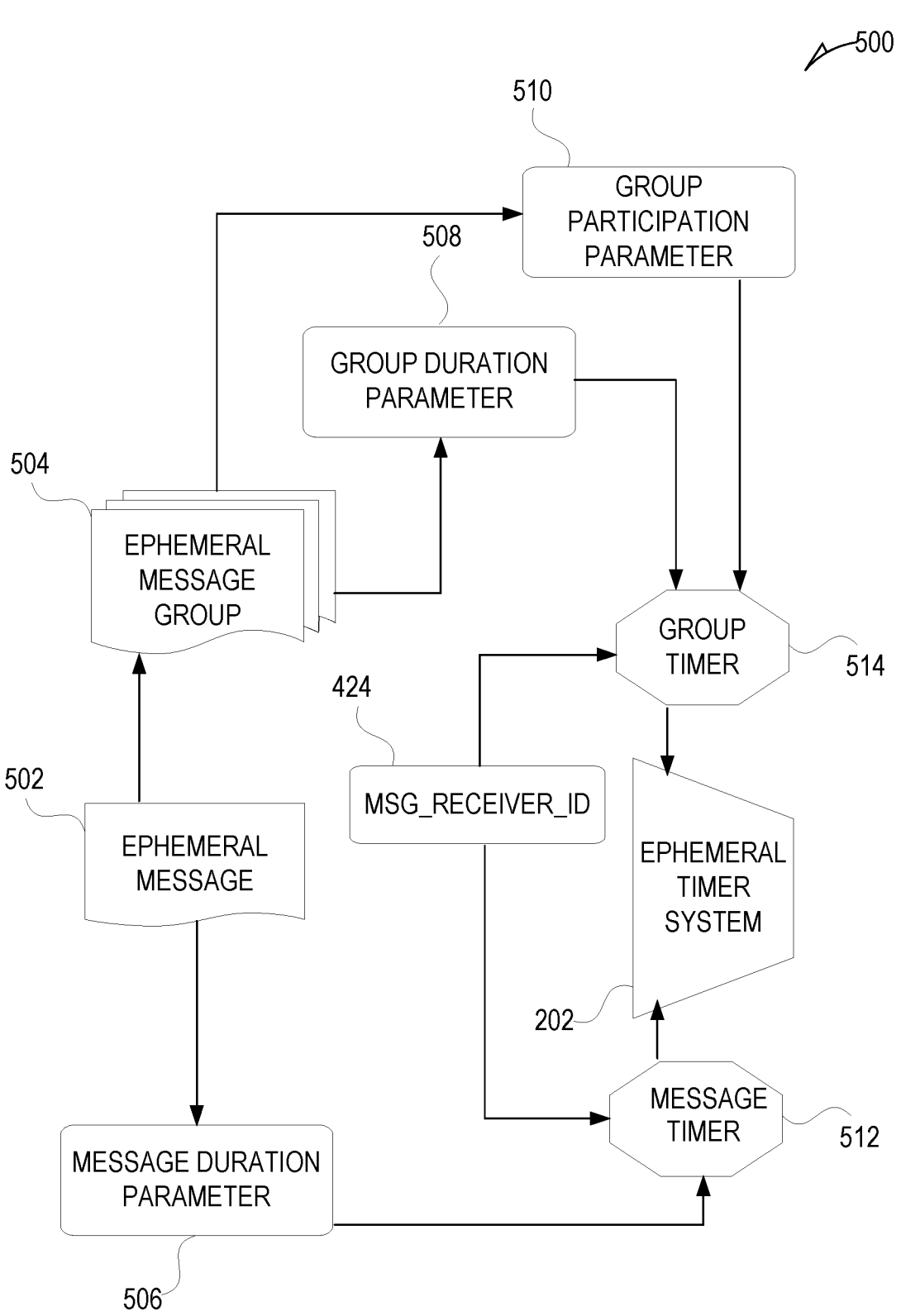
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral). The content of an ephemeral message 502, in some examples, includes an image or a video that was created using a viewfinder ring flash.

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506. In some examples, the ephemeral message 502 may include a video created using a real time video editor.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Process Flow and User Interfaces

Figure 6:
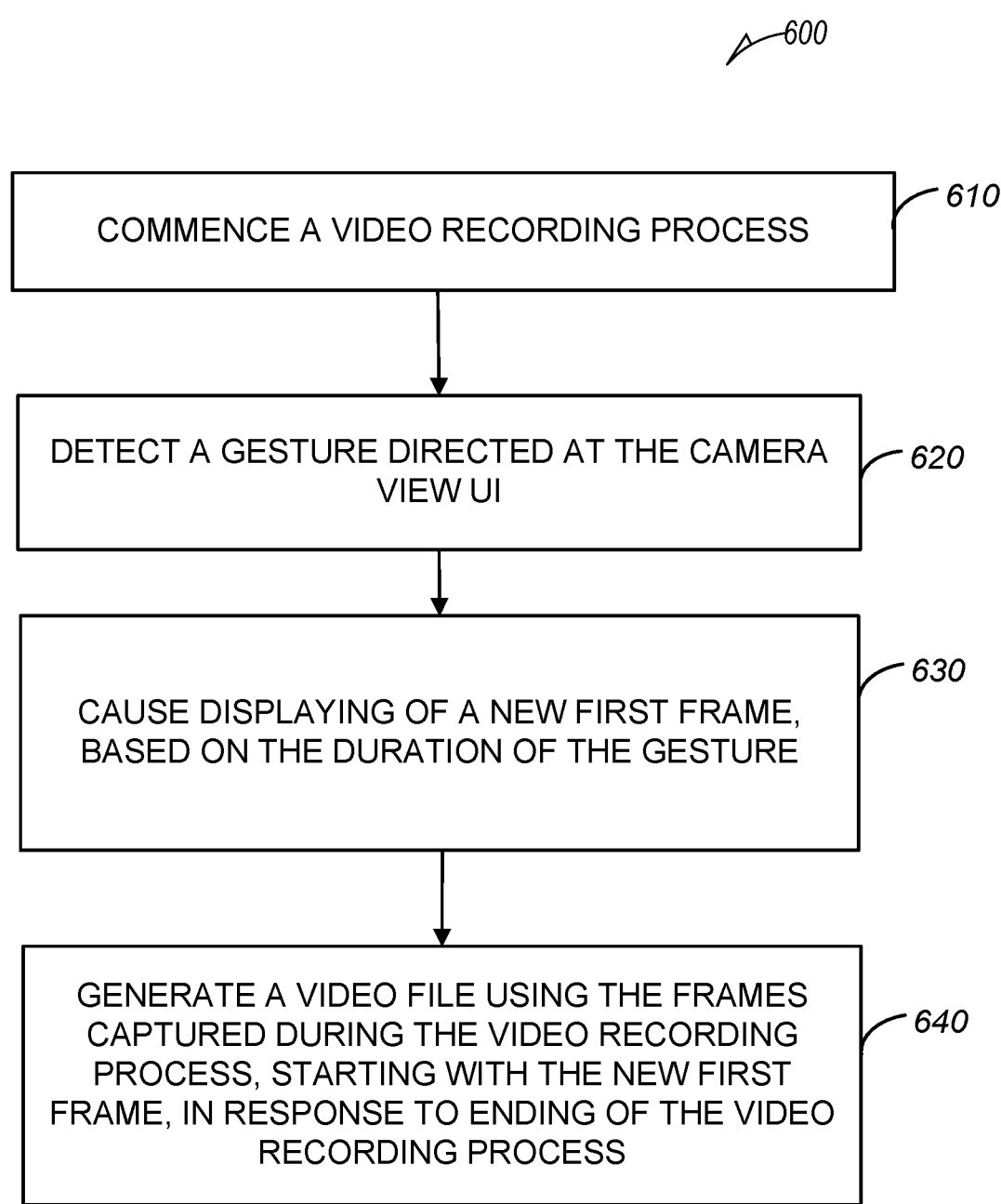
FIG. 6 is a flowchart illustrating a method for real time video editing in accordance with some examples.

FIG. 6 is a flowchart illustrating a method 600 for real time video editing in accordance with some examples. While certain operations of the process 600 may be described as being performed by certain devices, in different examples, different devices or a combination of devices may perform these operations. For example, operations described below may be performed by the client device 102 or in combination with a server-side computing device (e.g., the message messaging server system 108).

Figure 7:
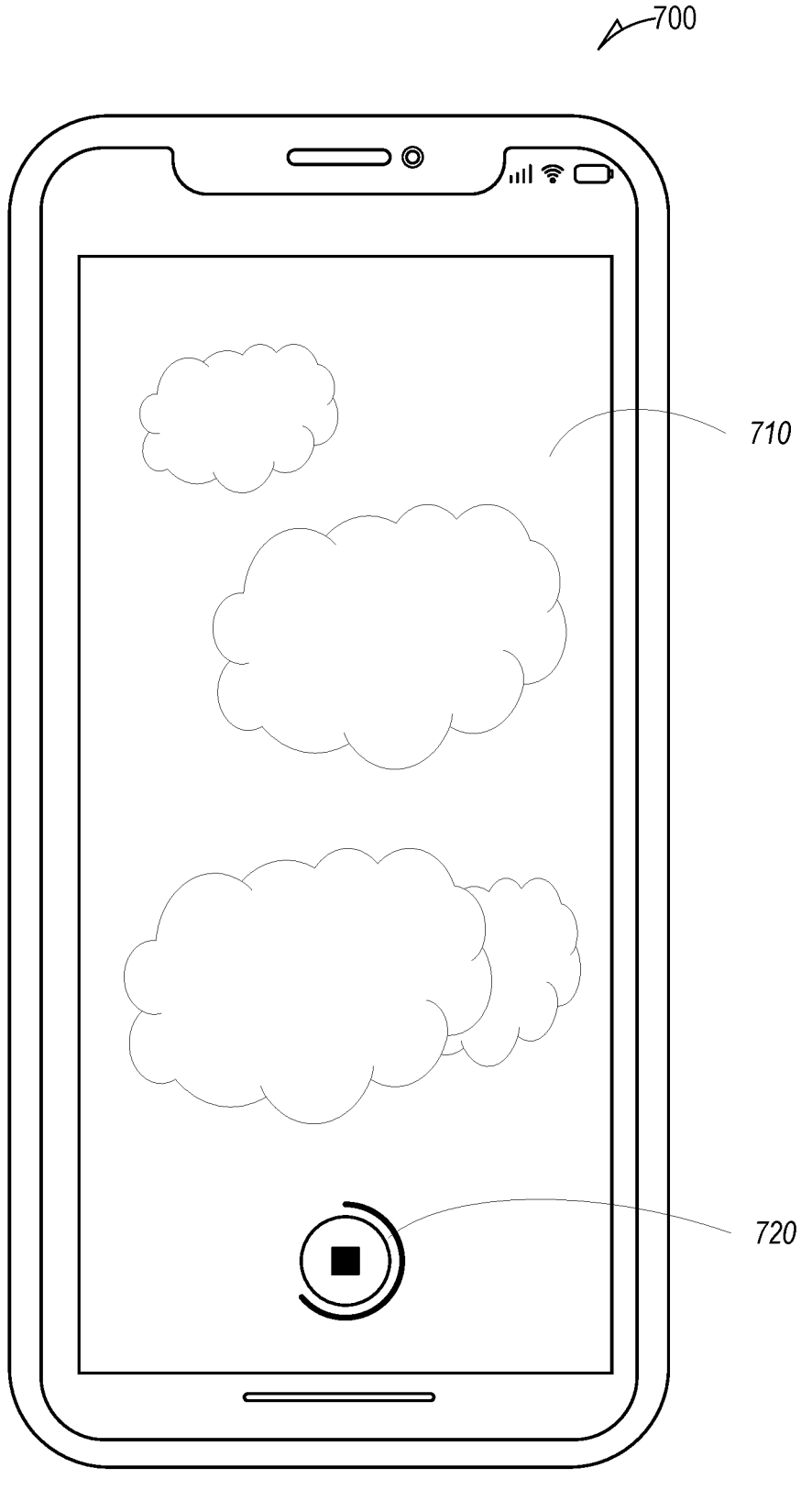
FIG. 7 is a diagrammatic representation of a camera view user interface displaying the output of the digital image sensor of a camera, in accordance with some examples.

The method 600 starts at operation 610, with commencing a video recording process by a camera of a client device. The video recording process, while in progress, produces a sequence of frames, each frame from the sequence of frames associated with a time stamp. The resulting video is not finalized until the video recording process is ended, at which time the resulting video is finalized (encoded into a desired format, for example, and saved for future access). The commencing of the video recording process occurs, in some examples, in response to activation of a shutter user selectable element in a camera view user interface (UI) displayed at a client device. An example of a camera view UI is shown in FIG. 7. FIG. 7 is a diagrammatic representation 700 of a camera view UI displaying the output of the digital image sensor of a camera. The output of the digital sensor of a camera is represented in area 710, showing the sky with clouds in this example. The camera view UI shown in FIG. 7 also includes a shutter user selectable element 720. In some examples, the camera view UI is provided by the messaging system for exchanging data over a network described above, with reference to FIG. 1-5.

Figure 8:
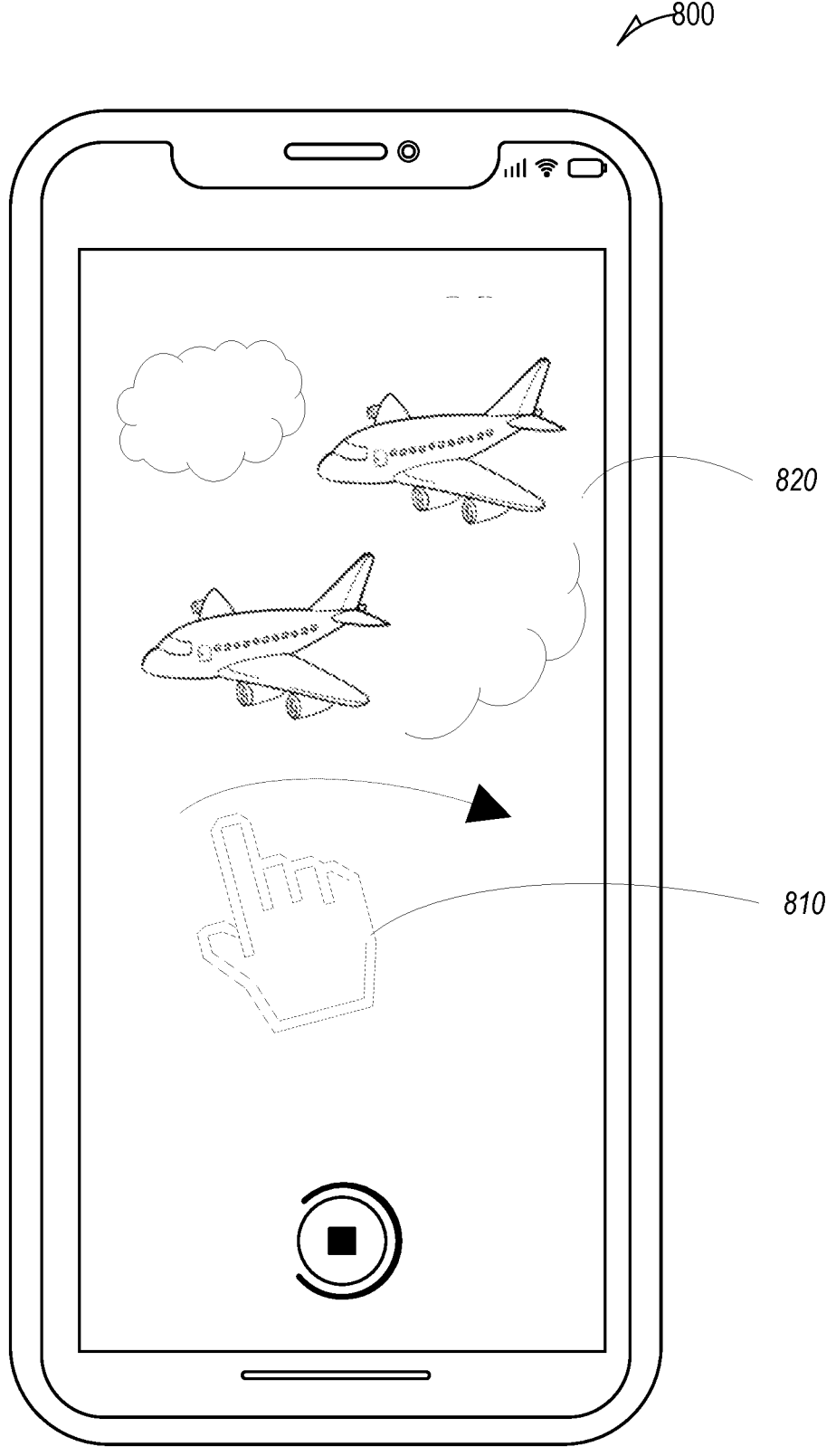
FIG. 8 is a diagrammatic representation of a swipe gesture directed at the camera view user interface, in accordance with some examples.

At operation 620, while the video recording process is in progress, the real time video editor detects a gesture directed at the camera view UI. The gesture can be, for example, a left to right swiping gesture, as illustrated in FIG. 8. FIG. 8 is a diagrammatic representation 800 of a left to right swiping gesture directed at the camera view UI displaying the output of the digital image sensor of the camera in area 820. In FIG. 8, the curved arrow pointing right and the stylized picture of a hand with a pointing finger, identified by reference numeral 810, are not part of the camera view UI, but rather a visualization of a swiping left to right gesture.

In response to the detecting of the gesture, the real time video editor causes displaying the captured frames in a reverse order (in a descending order based on respective time stamps of the frames), in a manner imitating rewinding of the video. The displaying of the captured frames in a sequential reverse order continues until the gesture stops, at which point the currently displayed frame is considered to be potentially a new starting point of a video that would result from the video recording process. The frame displayed in the camera view UI at the time the swiping gesture stops is referred to as a new first frame, for the purposes of this description.

At operation 630, in response to the detecting of the gesture, the real time video editor causes displaying of the new first frame, where the new first frame is selected based on the duration of the gesture. For example, if the gesture is brief, the sequence of frames being captured is rewound just a few frames back. If the gesture is longer, the sequence of frames is rewound further back. In some examples, the real time video editor may use, in addition to or instead of the duration, other characteristics of the gesture, such as speed, acceleration, and so on. The time stamp of the new first frame indicates a point in time prior to a time when the gesture was detected.

Figure 9:
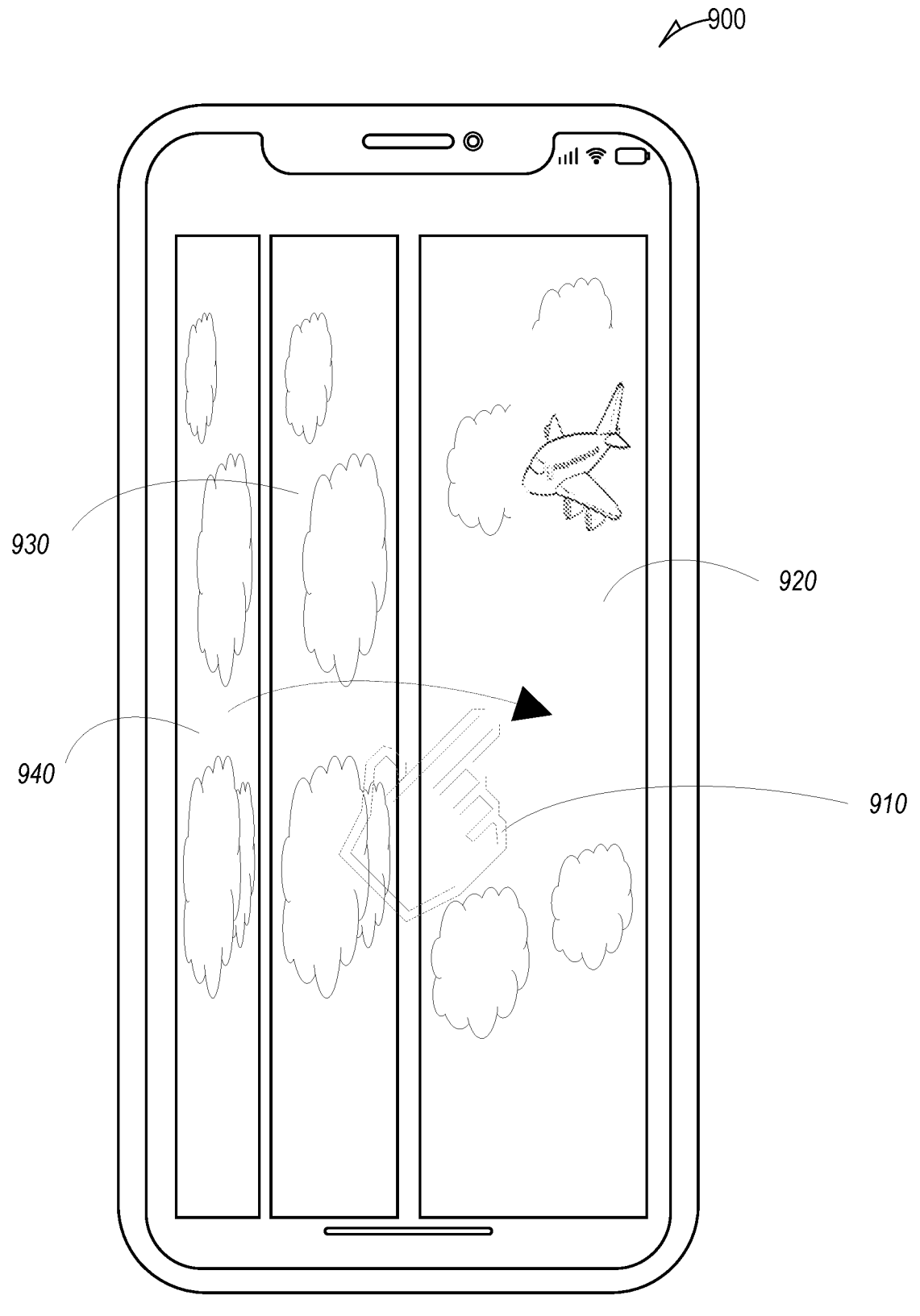
FIG. 9 is a diagrammatic representation of a of a rewind action imitation in a camera view user interface, in accordance with some examples.

FIG. 9 is a diagrammatic representation 900 of a of a rewind action imitation in a camera view user interface, in accordance with some examples. In FIG. 9, the curved arrow pointing right and the stylized picture of a hand with a pointing finger, identified by reference numeral 910, are not part of the camera view UI, but rather a visualization of a swiping left to right swiping gesture. Compared to FIG. 8, the stylized picture of a hand in FIG. 9 has a finger pointing to the right, which is a visualization of the ending of the gesture duration. Furthermore, while in FIG. 7, which is a visualization of one of the earlier frames with respect to commencement of the video recording, the output of a digital sensor of the camera in area 710 shows an empty sky with clouds, while in FIG. 8 the corresponding area 820 shows two planes, which is a visualization of an event that a user may have been expecting and wishing to capture in a video. In FIG. 9, frame 920 shows one plane, while frames 930 and 940 show just clouds, which is a visualization of the event of interest—arrival of the first plane in the sky—that occurred contemporaneously with capturing of frame 940. The real time video editing methodology described herein permits a user to "rewind" the video in real time, while the recording session is still in progress, and set the new starting point for the video, e.g., starting with the frame 940.

In some examples, subsequent to the displaying a new first frame from the sequence of frames in the camera view UI, and while the video recording process is still in progress, the real time video editor obtains from a user a selection or confirmation to identify the new first frame as a new starting point of the video recording process. The obtaining of the selection may be in the form of a presentation of a user selectable element overlaid over the new first frame presented in the camera view UI. In order to make the new first frame a new starting point of the video that would result from the video recording process, the real time video editor may be configured to discard frames with time stamps indicating time prior to the time stamp of the new first frame (in other words, starting with the new first frame).

Figure 10:
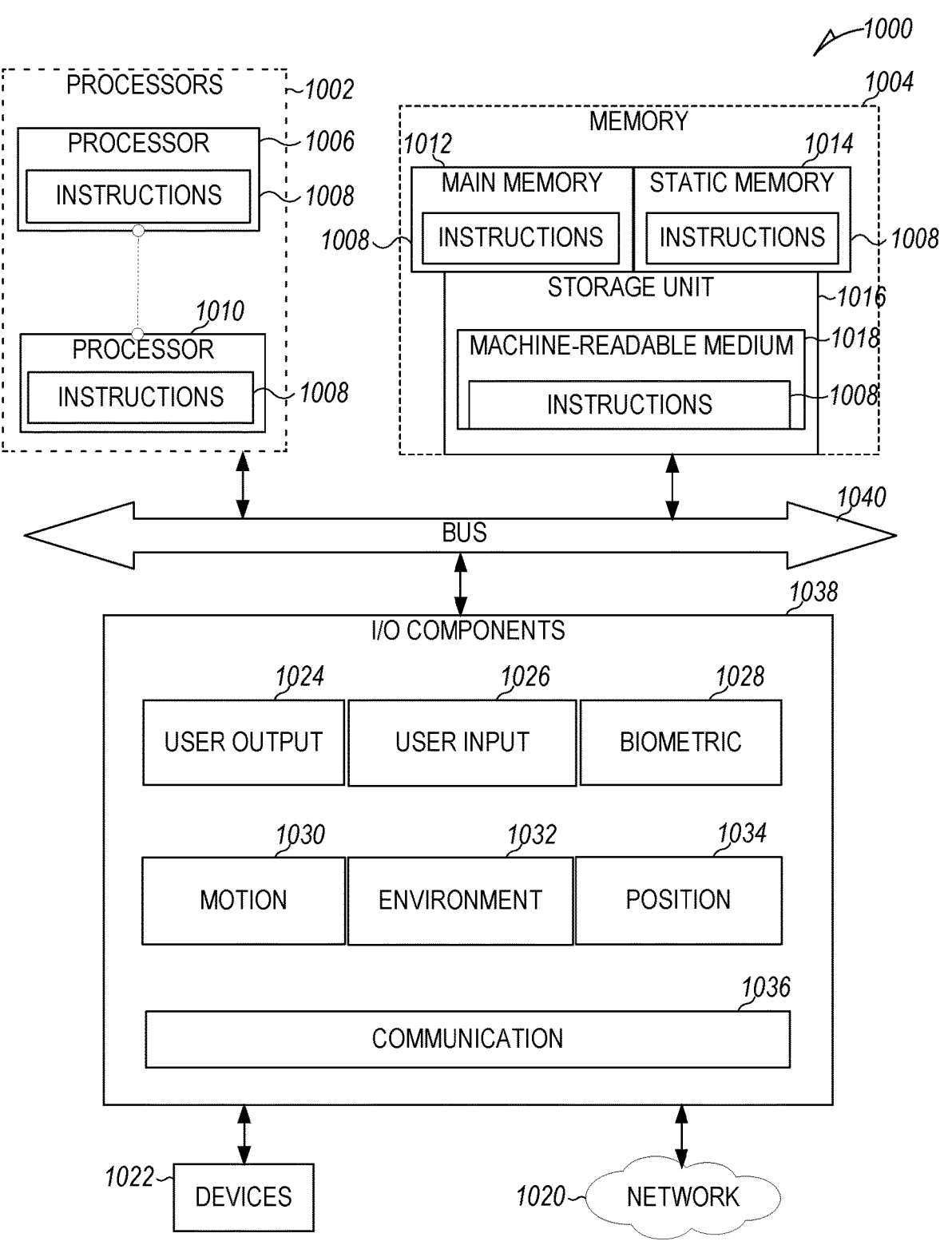
FIG. 10 is a diagrammatic representation of a machine in the form of a computer system within which a set of instructions may be executed for causing the machine to perform any one or more of the methodologies discussed herein, in accordance with some examples.

At operation 640, in response to ending or stopping of the video recording process, the real time vide editor generates a video file using frames captured during the video recording process, starting with the new first frame except for frames with time stamps indicating earlier time than the time stamp of the new first frame. The ending of the video recording process may be in response to a further activation of a shutter user selectable element in a camera view UI.
Machine Architecture FIG. 10 is a diagrammatic representation of the machine 1000 within which instructions 1008 (e.g., software, a program, an application, an applet, an app, or other executable code) for causing the machine 1000 to perform any one or more of the methodologies discussed herein may be executed. For example, the instructions 1008 maycause the machine 1000 to execute any one or more of the methods described herein. The instructions 1008 transform the general, non-programmed machine 1000 into a particular machine 1000 programmed to carry out the described and illustrated functions in the manner described. The machine 1000 mayoperate as a standalone device or may be coupled (e.g., networked) to other machines. In a networked deployment, the machine 1000 mayoperate in the capacity of a server machine or a client machine in a server-client network environment, or as a peer machine in a peer-to-peer (or distributed) network environment. The machine 1000 may-comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein. The machine 1000, for example, may comprise the client device 102 or any one of a number of server devices forming part of the messaging server system 108. In some examples, the machine 1000 mayalso comprise both client and server systems, with certain operations of a particular method or algorithm being performed on the server-side and with certain operations of the particular method or algorithm being performed on the client-side.

The machine 1000 may include processors 1002, memory 1004, and input/output I/O components 1038, which may be configured to communicate with each other via a bus 1040. In an example, the processors 1002 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single-core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, both accessible to the processors 1002 via the bus 1040. The main memory 1004, the static memory 1014, and storage unit 1016 store the instructions 1008 embodying any one or more of the methodologies or functions described herein. The instructions 1008 mayalso reside, completely or partially, within the main memory 1012, within the static memory 1014, within machine-readable medium 1018 within the storage unit 1016, within at least one of the processors 1002 (e.g., within the Processor's cache memory), or any suitable combination thereof, during execution thereof by the machine 1000.

The I/O components 1038 may include a wide variety of components to receive input, provide output, produce output, transmit information, exchange information, capture measurements, and so on. The specific I/O components 1038 that are included in a particular machine will depend on the type of machine. For example, portable machines such as mobile phones may include a touch input device or other such input mechanisms, while a headless server machine will likely not include such a touch input device. It will be appreciated that the I/O components 1038 may include many other components that are not shown in FIG. 10. In various examples, the I/O components 1038 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1038 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, rotation sensor components (e.g., gyroscope).

The environmental components 1032 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front facing cameras on a front surface of the client device 102 and rear cameras on a rear surface of the client device 102. The front facing cameras may for example, be used to capture still images and video of a user of the client device 102 (e.g., "selfies"), which may then be augmented with augmentation data (e.g., filters) described above. In the examples where the front facing camera is used with a viewfinder ring flash described herein, the user has the ability to use augmented reality face filters in low light conditions, even in complete darkness, as the viewfinder ring flash illuminates the user's face without obscuring the output of the digital image sensor. The rear cameras may for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1038 further include communication components 1036 operable to couple the machine 1000 to a network 1020 or devices 1022 via respective coupling or connections. For example, the communication components 1036 may include a network interface Component or another suitable device to interface with the network 1020. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1022 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF410, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1012, static memory 1014, and memory of the processors 1002) and storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed examples.

The instructions 1008 may be transmitted or received over the network 1020, using a transmission medium, via a network interface device (e.g., a network interface component included in the communication components 1036) and using any one of several well-known transfer protocols (e.g., hypertext transfer protocol (HTTP)). Similarly, the instructions 1008 may be transmitted or received using a transmission medium via a coupling (e.g., a peer-to-peer coupling) to the devices 1022.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example examples, the processors or processor-implemented components may be located in a single geographic location (e.g., within a home environment, an office environment, or a server farm). In other example examples, the processors or processor-implemented components may be distributed across a number of geographic locations.

"Computer-readable storage medium" refers to both machine-storage media and transmission media. Thus, the terms include both storage devices/media and carrier waves/ modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium"

and "signal medium" mean the same thing and may be used interchangeably in this disclosure.

What is claimed is:

1. A method comprising:
   while a video recording process of a camera is in progress on a device to record one or more events in a real-world environment, detecting an action directed at the device;
   adjusting, based on the action and while continuing to record the one or more events in the real-world environment, a starting point of a video file to be generated based on a recording produced by the video recording process;
   causing presentation of the adjusted starting point in a user interface of the device while continuing to record the one or more events in the real-world environment;
   subsequent to commencement of the presentation of the adjusted starting point, and while continuing to record the one or more events in the real-world environment, obtaining input from a user to identify the adjusted starting point as a selected starting point for the video file; and
   generating the video file, the video file comprising a portion of the recording and having the adjusted starting point.

2. The method of claim 1, wherein the video file is generated in response to ending of the video recording process.

3. The method of claim 2, wherein the user interface is a camera view user interface comprising output of a digital sensor of the camera of the device, and wherein the ending of the video recording process is in response to activation of a user-selectable element in the camera view user interface.

4. The method of claim 1, wherein the action comprises a gesture that is directed at the user interface.

5. The method of claim 4, wherein the gesture comprises a swiping gesture.

6. The method of claim 1, wherein the video recording process produces a sequence of frames, the method further comprising:
   in response to the detecting of the action, commencing presentation, in the user interface, of frames from the sequence of frames in reverse order.

7. The method of claim 6, wherein the presentation, in the user interface, of the frames from the sequence of frames in reverse order continues until detecting stopping of the action.

8. The method of claim 1, wherein the presentation of the adjusted starting point is caused in response to detecting stopping of the action.

9. The method of claim 1, wherein the recording comprises a plurality of frames, the adjusted starting point comprises a new first frame from the plurality of frames for the video file, the new first frame being presented in the user interface, and wherein obtaining of the input comprises presentation of a user-selectable element overlaid over the new first frame presented in the user interface.

10. The method of claim 1, wherein the portion of the recording is a second portion of the recording that starts with the adjusted starting point, the method further comprising:
    discarding a first portion of the recording earlier in time than the adjusted starting point.

11. The method of claim 1, wherein the action is a gesture, and the adjusted starting point is determined based on a characteristic of the gesture.

12. The method of claim 11, wherein the characteristic of the gesture comprises duration of the gesture.

13. The method of claim 11, wherein the characteristic of the gesture comprises acceleration of the gesture.

14. The method of claim 1, wherein the adjusted starting point is a frame of the recording, the frame having been recorded prior to a time when the action is detected.

15. The method of claim 1, wherein the user interface is a camera view user interface comprising output of a digital sensor of the camera of the device, the method further comprising, prior to the detecting of the action:

detecting activation of a user-selectable element in the camera view user interface; and in response to detecting the activation of the user-selectable element, commencing the video recording process.

16. The method of claim 1, wherein the user interface is provided by a messaging system for exchanging data over a network.

17. A system comprising:

one or more processors; and a non-transitory computer readable storage medium comprising instructions that when executed by the one or more processors cause the one or more processors to perform operations comprising:

while a video recording process of a camera is in progress on a device to record one or more events in a real-world environment, detecting an action directed at the device;

adjusting, based on the action and while continuing to record the one or more events in the real-world environment, a starting point of a video file to be generated based on a recording produced by the video recording process;

causing presentation of the adjusted starting point in a user interface of the device while continuing to record the one or more events in the real-world environment;

subsequent to commencement of the presentation of the adjusted starting point, and while continuing to record the one or more events in the real-world environment, obtaining input from a user to identify the adjusted starting point as a selected starting point for the video file; and generating the video file, the video file comprising a portion of the recording and having the adjusted starting point.

18. The system of claim 17, wherein the video recording process produces a sequence of frames, the operations further comprising:

in response to the detecting of the action, commencing presentation, in the user interface, of frames from the sequence of frames in reverse order, wherein the presentation, in the user interface, of the frames from the sequence of frames in reverse order continues until detecting stopping of the action.

19. The system of claim 17, wherein the recording comprises a plurality of frames, the adjusted starting point comprises a new first frame from the plurality of frames for the video file, the new first frame being presented in the user interface, and wherein obtaining of the input comprises presentation of a user-selectable element overlaid over the new first frame presented in the user interface.

20. A machine-readable non-transitory storage medium having instruction data executable by a machine to cause the machine to perform operations comprising:

while a video recording process of a camera is in progress on a device to record one or more events in a real-world environment, detecting an action directed at the device;

adjusting, based on the action and while continuing to record the one or more events in the real-world environment, a starting point of a video file to be generated based on a recording produced by the video recording process;

causing presentation of the adjusted starting point in a user interface of the device while continuing to record the one or more events in the real-world environment;

subsequent to commencement of the presentation of the adjusted starting point, and while continuing to record the one or more events in the real-world environment, obtaining input from a user to identify the adjusted starting point as a selected starting point for the video file; and generating the video file, the video file comprising a portion of the recording and having the adjusted starting point.

* * * * *